Figure 1:
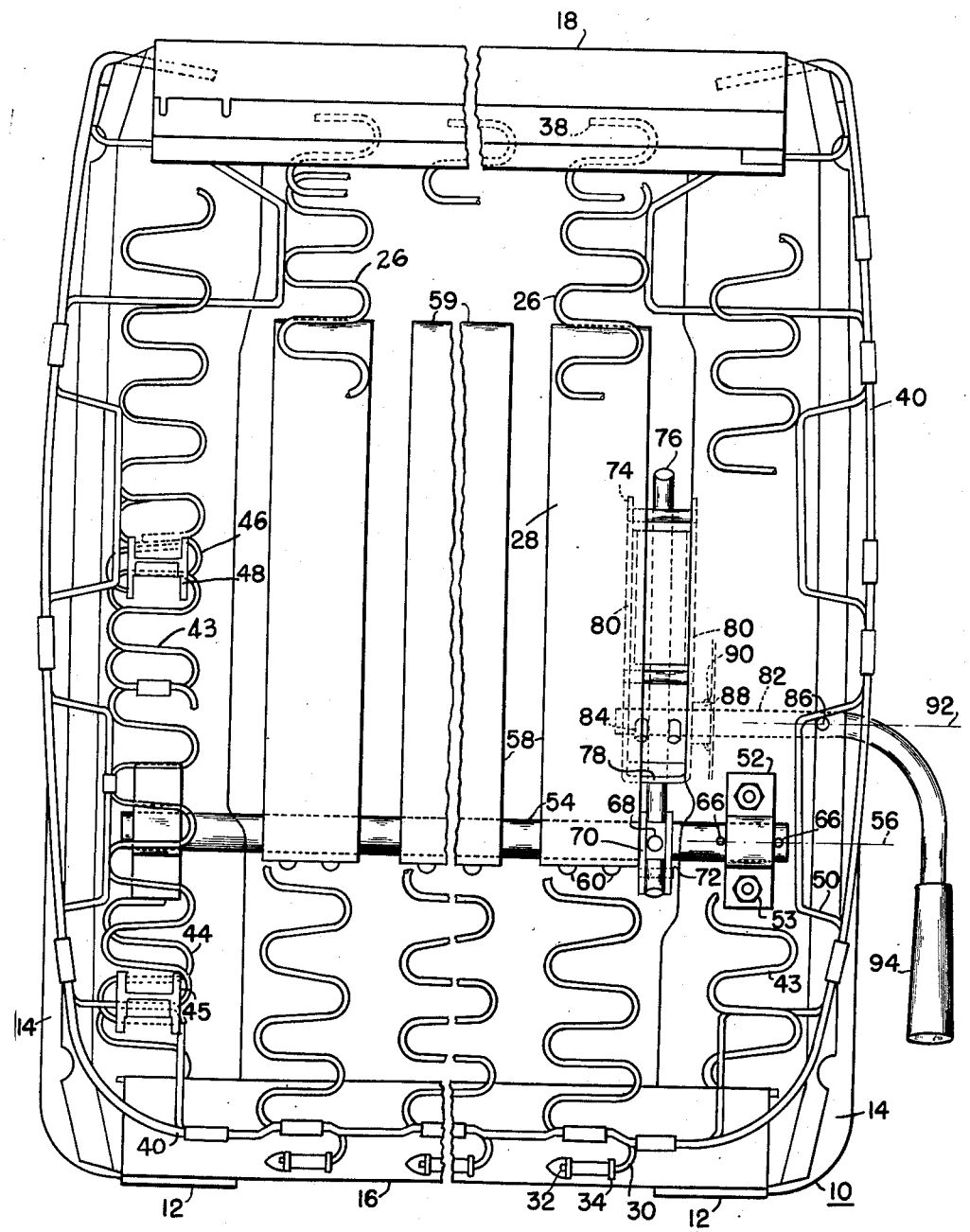

Dec. 31, 1957   E. A. HERIDER ET AL   2,818,105
SPRING SEAT ASSEMBLY
Filed May 22, 1956   2 Sheets-Sheet 1

INVENTORS.
Elmer A. Herider
James C. Cumming
BY
Webb, Mackey & Burden
THEIR ATTORNEYS Dec. 31, 1957   E. A. HERIDER ET AL   2,818,105
SPRING SEAT ASSEMBLY
Filed May 22, 1956
2 Sheets-Sheet 2
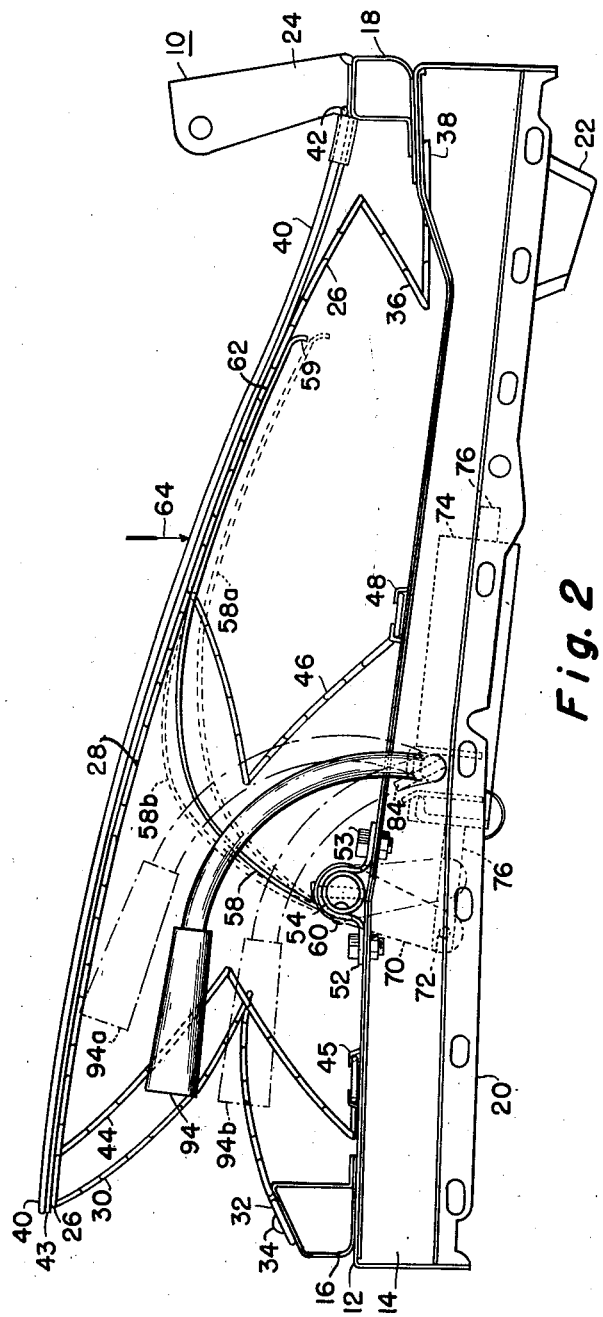
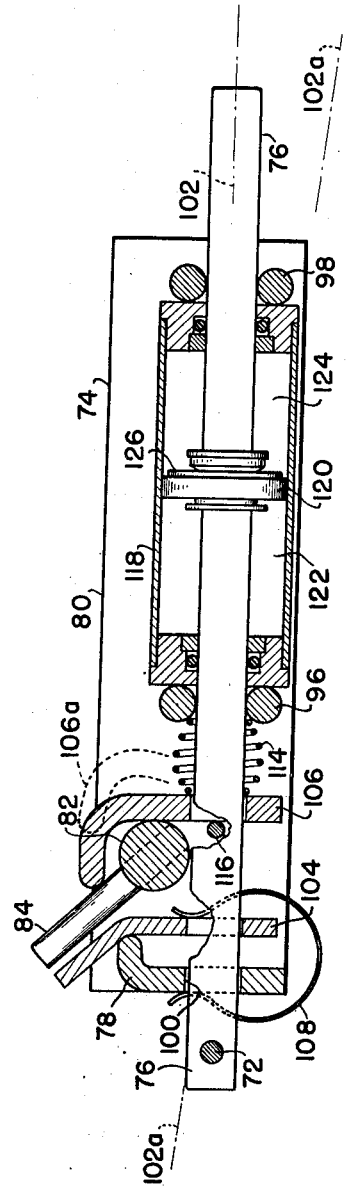
INVENTORS.
Elmer A. Herider
James C. Cumming
BY
Webb, Mackey & Burden
THEIR ATTORNEYS

United States Patent Office 2,818,105
Patented Dec. 31, 1957

2,818,105

SPRING SEAT ASSEMBLY

Elmer A. Herider, Dearborn Township, Wayne County, and James C. Cumming, Detroit, Mich., assignors to Rockwell Spring and Axle Co., Coraopolis, Pa., a corporation of Pennsylvania Application May 22, 1956, Serial No. 586,551

15 Claims. (Cl. 155—179)

This invention relates to a sinuous spring cushion with an adjustable spring rate. It is particularly suited to automotive use when applied to the spring seat assembly.

Zigzag or sinuous spring seats enjoy widespread usage in the automobile and truck field and by design they receive the weight of the occupant somewhat closer to the rear major edge of the seat than to the front. Such springs stiffen as they deflect with the vehicle occupant and reach a balanced position in correspondence with his weight, thus carrying a heavier occupant at a lower static level than a lighter occupant is carried. As the vehicle jounces and rebounds under road irregularities, the occupant is carried first deeper into the seat and then higher by the seat as his weight causes it to oscillate above and below the static loaded level which may be termed the neutral position.

According to the present improvement, regulator means is provided to adjust the spring rate of a sinuous spring cushion whereby a vehicle occupant can adjust his position to the neutral level desired regardless of his weight. Thus, the spring seat rate can be stiffened at will to a point at which the seat is very firm and a heavy occupant in the vehicle will not penetrate very deep into the seat cushion even on rough roads and the spring rate can also be reduced to a point at which the seat is relatively soft and a lighter occupant will sink very deeply into the seat cushion.

More specifically, the regulator means includes adjustably tensioned helper spring bands connected in a tandem with the seating portion of the sinuous spring wires, the connection being at a location vertically aligned with the customary point at which the occupant's weight is normally concentrated. The helper spring bands are of general bow shape and are mounted in a prestressed cantilever fashion with their free ends flattened into longitudinal engagement with and beneath the spring wires. Adjustment of the band tension changes their prestress to produce a corresponding change in the overall spring rate as desired. The bands have a common torque tube and locking actuator to maintain the band tension which, with increased torque flattens the midportion of each band into greater length of tangential contact with its sinuous wire so as to foreshorten the effective cantilever length of the band and thus produce its increased stiffness. The torque adjustment can be made with the seat occupied or unoccupied and one particular means and manner for making this adjustment will readily become apparent from the more detailed description to follow.

A preferred embodiment of the invention is shown in the accompanying drawings in which, in general;

Figure 1 is a plan view of a seat assembly embodying the present spring cushion, Figure 2 is a side elevational view of the cushion showing the actuator in outline, and Figure 3 is a fragmentary view corresponding to Figure 2, but with the actuator in an enlarged sectional showing.

In specific reference to the drawings, a seat assembly 10 is shown having a generally rectangular frame 12 including two side rail members 14 of hollow construction and preferably a third parallel rail member midway therebetween but not shown. The rail members interconnect a hollow pair of front and rear cross members 16, 18 which complete the frame arrangement, with the side rails 14 being the actual supporting members therebelow. The frame 12 carries a flanged member 20 forming a depending skirt below the frame members. At their rear ends each of the side rails 14 carries a foot bracket 22 and they are adapted to be slidably mounted to a set of generally fore and aft extending seat trackways, not shown, but conventionally arranged to be made fast to a platform or the floor pan in an automotive vehicle. The rear cross member 18 carries a mounting bracket 24 for pivotally or otherwise supporting a double or a split back rest, not shown.

The seat assembly 10 has a reticulated supporting surface adapted to be padded with a layer of foam rubber and covered with the usual seat cloth, not shown, and this surface is provided principally by a row of spring wires 26 which are supported by the base frame 12. Each spring wire 26 has a seating portion 28 intermediate its opposite ends and at the front end the spring wire is bent at 30 to form a downwardly rearwardly, thence downwardly forwardly extending leg having a hooked end 32 secured to an anchoring bracket 34 carried by the front cross members 16. At the rear end each spring wire 26 is bent at 36 to form a downwardly forwardly and thence rearwardly extending leg having a hook 38 secured to an anchoring bracket, not shown, carried at the underside of the rear cross rail 18. An edge wire 40 follows the front edge of the reticulated seating surface adjacent the junction between the portions 28 and 30 of the spring wires 26 and is arranged in generally known fashion to extend about the front margin and two adjacent sides of a wire mesh type seat cushion formed by the wire elements 26 just considered which are preferably zigzag springs. The opposite ends of the edge wire 40 have hooks 42 which are secured to the rear cross member 18.

Immediately over each of the side rails 14 an auxiliary zigzag wire 43 may be provided which is bent at its opposite ends to provide supporting legs such as the front legs 44 which yieldably connect it to a mounting clip 45 carried by the seat frame 12. An intermediate spring connection 46 connects the midportion of each auxiliary wire 43 and the midportion of the corresponding side rail 14, the lower end of the connection 46 being secured to an anchoring clip 48 directly carried by that side rail. One or more tie wires 50, Figure 1, are clipped or otherwise secured between the seating portion of the auxiliary spring wire 43 and the edge wire 40 to unify the seat supporting surface.

Each of the side rails 14 carries a half bearing bracket 52 which is bolted at 53 thereto and which together with the other bearing bracket journals the opposite ends of a hollow torque tube 54 for rocking movement on a fixed axis 56 located immediately to the rear of and extending longitudinally to the row of legs 30 for the zigzag wires 26. The torque tube 54 carries the fixed end of a plurality of spring bands 58 each of which acts as a helper spring for and is disposed in the vertical plane of one zigzag wire 26. A pair of rivets 60 connects the fixed end of each band 58 to the torque tube 54 in a coplanar tangential arrangement whereby the rivets 60 are directly aligned with one another and the bands 58 are carried in a row. The bands 58, which were steel strips 2 inches in width in one physically constructed embodiment of the invention, bow rearwardly into tangential engagement with the underside of the zigzag wires 26 which in the same construction conformed to a sinuous path narrower than the bands, being 1⅞ inches in width. In any case, it is preferred that each helper band 58 be substantially coextensive with its zigzag wire in overall width. Each band 58 has a turned outer end 59 and a coating 62 of sound-deadening material present at least on its interface of engagement with the wire 26. This interface of engagement is intersected by a downwardly directed vector 64 representing the concentration of the normal seat occupant's weight and by design occurring approximately 4 inches closer to the rear major edge of the seat than to the front major edge defined by the edge wire 40.

From the adjusted position of the rock shaft 54 shown in solid lines in Figure 2, the bands 58 will deflect under load from their corresponding solid line position into the dotted line position 58a which they thus assume by moving in the direction of the vector 64 in tandem with the seating portions 28 of the zigzag wires 26. The cantilever length of the bands 58 remains essentially constant during such movement and the resistance of the seat to deflection increases as the sum of the resistances of the helper bands 58 and the zigzag wires 26 gradually increases.

The firmness of the seat can be readily increased if the rock shaft 54 in Figure 2 is rotated counterclockwise to cause the bands 58 to occupy their dotted line position shown by the dotted lines 58b. In assuming the latter position, the effective length of the cantilever portion of each band 58 is decreased owing to the fact that more of its midportion is flattened into the tangential contact with the zigzag wires 26 and hence, both the stiffness and the pretension of the helper bands 58 increases. Accordingly, the overall spring rate of the zigzag spring wires 26 and the helper bands 58 is increased. If it is assumed that the seat is in a statically loaded position with a light occupant who is seated at a level corresponding to the solid line showing of the bands 58, then it is manifest that a static loaded position for a heavier occupant could be maintained at the same level if the bands 58 are pretensioned into the dotted line position shown by the dotted lines 58b in Figure 2.

At one end the torque tube 54 carries a pair of spaced locator pins 66, Figure 1, which engage the half bearing bracket 52 at that end to prevent axial displacement of the torque tube 54. The torque tube 54 carries another locator pin 68 in an adjacent position disposed between a closely spaced pair of plates 70 which form a depending crank and which mutually carry a pivot pin 72 at the swinging end of the crank. An actuator device 74 slidably carries a control rod 76 which at its forward end has an aperture with which it is pivotally connected to the crank plates 70 by means of the pin 72. The actuator 74 has a generally U-shaped one-piece frame including a common end plate 78 to which a pair of long parallel legs 80 is joined. A rock shaft 82 passes through a pair of registering openings in the opposite legs 80 and carries a pair of spaced locator pins 84 at one end which hold the actuator 74 against axial shift relative to the shaft 82. The rock shaft 82 has a straight central section passing through a pair of aligned openings in the opposite walls of the side rail 14 in the seat frame and adjacent one of these openings, the rock shaft 82 carries a locator pin 86 engaging the wall of the rail. Adjacent the other opening, a stub bearing 88 is welded at 90 to the side rail 14 to reduce the concentration of the load of the shaft on that side of the side rail 14. The rock shaft 82 therefore is rotatable about an axis 92 passing through the rail 14 and the actuator 74 is swingable about this same axis 92 as a center. The rock shaft 82 has a bent crank end which carries an actuator handle 94 rockable from solid line position of Figure 2 into either one of the upper or lower dotted line positions shown by the respective dotted lines 94a and 94b.

The spaced legs 80 of the U-frame in the actuator 74 are riveted together at their midportion by means of a pair of rivets 96 and are further riveted together at their front extremities by means of another pair of rivets 98. The control rod 76 slides through these pairs of rivets as guides and also passes through an aligned opening 100 formed in the frame end plate 78. This control rod 76 acts in tension in a direction to the right as viewed in Figure 3 along an axis 102 so as to pull against the pivot pin 72 carried by the crank for the torque arm 54. An apertured pair of gripper plates 104 and 106 in the actuator coaxially receive the control rod 76 which is cylindrical and which has a shaft diameter approximately three thousandths inches less than the diameter of the apertures in the plates. A U-shaped strip spring 108 has a pair of apertures in the opposite legs thereof which coaxially receive the control rod 76 and bias the plate 104 toward the frame end plate 78 to cause the plate to bind on the rod 76 and lock it fast against the pull of the crank pin 72.

The locator pins 84 on the rock shaft 82 can be appropriately manipulated counterclockwise from the position shown in Figure 3 to engage a bent upper end on the plate 104 to cause it to fulcrum about an inturned lip of the frame end plate 78 for releasing the plate from its binding engagement locking the rod and enabling the rod to slide freely to the left as viewed in Figure 3. Under opposite manipulation of the rock shaft 82, the locator pins 84 are rocked clockwise from the position shown in Figure 3 to engage an upper arm bent at right angles to the plate 106 to cause the plate 106 to undergo two types of motion in moving to the dotted line position thereof shown by the dotted lines 106a in Figure 3. The initial result of the motion on the plate 106 is to tilt it and cause it to bind upon the rod 76 and the subsequent motion of the plate forces the rod 76 to move in the same rectilinear direction therewith. When pressure is released on the handle 94, a return spring 114 forces the plate 106 to slide rearwardly on the rod 76 and against an inside set of small stop pins 116 carried by the side legs 80 of the actuator frame. When the plates 104, 106 relatively reciprocate to pull the left end of the control rod 76 upon the arc about the torque tube axis 56 to the right and then upwardly as viewed in Figure 2, the actuator frame tilts about the rock shaft axis 92, Figure 1, and correspondingly the axis 102 of the control rod 76 tilts into a more clockwise position as shown by the dotted lines 102a in Figure 3. Unlocking of the locking plate 104 releases the rod 76 and enables it to undergo sliding motion in an opposite direction through the actuator 74 and also opposite tilting motion as viewed in Figure 3.

A hydraulic damper cylinder 118 is trapped between the pairs of rivets 96, 98 in the actuator 74 to prevent uncontrolled release of the control rod 76 when the locking plate 104 is unlocked. The damper cylinder 118 has mechanism to resist motion one way including a piston 120 having a passage therethrough interconnecting a compression chamber 122 in the cylinder and a reservoir chamber 124 and controlled by a disk valve 126. The piston 120 is capable of limited sliding movement on the rod 76 whereas the disk valve 126 is fast to the rod except for its edges which deflect, but they form no per se part of the present invention and their construction and operation are more completely described in the copending Herider application, Serial No. 580,835, filed April 26, 1956 and assigned to the assignee of the present application. Briefly, however, the disk valve 126 bends against and closes the piston passage and thus hydraulically locks the piston 120 against movement in the cylinder when the pressure in the compression chamber 122 becomes excessive due to the presence of the fluid which the piston 120 traps therein as it moves toward the chamber 122 to the left in Figure 3. Fluid will at all times transfer freely through the piston 120 from the reservoir chamber 124 into the compression chamber 122 and hence the piston readily moves toward the reservoir chamber 124 to the right as viewed in Figure 3, without any interference from the disk valve 126.

It will thus be apparent that through appropriate movement of the control handle 94, Figure 1, an occupant of the seat assembly 10 can control the operation of the actuator 74 in either direction and thereby cause the crank plates 70 to be rocked at will to change the angular position of the torque tube 54 and the degree of prestress in the helper bands 58. To increase the firmness of the seat, the operator oscillates the handle between the solid line position and the dotted line position shown by the dotted lines 94a in Figure 2 and in a few strokes of the plate 106 the bands are wound into the dotted line position of high prestress shown by the dotted lines in 58b in Figure 2. To render the seat softer the handle 94 is moved into the dotted line position shown by the dotted lines 94b in Figure 2 and the bands 58 begin to relax slowly and continue to do so until the operator releases the handle 94 whereupon the locking plate 104, Figure 3, automatically binds on the control rod 76 to relock the torque tube 54 to which the bands are anchored.

While we have described certain presently preferred embodiments of our invention, it is to be understood that it may be otherwise embodied within the scope of the following claims.

We claim:

1. In a spring seat assembly, a seat frame having zigzag springs forming a seating surface and having a rotatable member mounted below the springs, cantilever bands connected at one end to the rotatable member and having outer swinging portions each contacting with a zigzag spring intermediate its ends, and means for rotating the rotatable member to change the flexure of the bands and their contact pressure against the zigzag springs.

2. A spring seat assembly having a seating portion formed with zigzag wires having companion supporting legs at the front and rear, cantilever spring means for exerting pressure on the zigzag wires along a portion spanning between said companion legs, and means fast to one end of the cantilever spring means and constituting the sole support therefor in holding the spring means under pressure with the opposite end against the zigzag wires.

3. In a spring seat assembly a seat frame having a row of longitudinally extending zigzag wire elements, another row of curved flat springs below and corresponding in number to the zigzag wire elements, and a common support for the springs extending transversely thereto and affixed to one end thereof, the overall width of each zigzag wire being substantially equal to the width of the corresponding one of the flat springs and said support holding the springs in curved cantilever disposition against the underside of the zigzag wires.

4. In a spring seat assembly, a seat frame having zigzag springs forming a seating surface and a band support having different positions of adjustment below the springs, tension bands having an end portion connected to the adjustable support and each having the opposite end portion connected to move with the intermediate portion of a zigzag spring, and means for adjusting the band support to change the resistance to movement of the springs.

5. In a spring seat assembly a seat frame having reticulated seating means presenting a slightly curved supporting surface and a torque tube spaced below said supporting surface, bent spring strips connected at one end to the torque tube and cantileverly supported thereby to engage in surface contact with and conform in curvature to a portion of the reticulated seating means, and means for adjusting the position of said torque tube to bend the spring strips into tighter engagement with the seating means.

6. In a spring seat assembly, a seat frame having a wire mesh seating surface, curved flat bands having cantilever body portions bridging between their opposite ends and having one end flattened in lengthwise contact against the seating surface, and means to wind the bands at their opposite end to promote flattening of the same at their said one end into greater length of contact with the seating surface and thus control the stiffness of the bridging body portion by correspondingly reducing the effective cantilever length thereof.

7. A spring seat assembly having a horizontally disposed seating element provided with companion supporting legs at the front and rear for carrying a load, and a helper spring supported from a point spaced from the supporting legs below the seating element and together having coextensive longitudinal portions in continuous engagement with one another along a sliding interface of contact for a substantial length.

8. A spring seat assembly having a pair of tandem connected load springs engaged to rub one another during their movement in line with the load, and a spring coating material on at least one of the springs to control the effect of the other spring in rubbing thereagainst.

9. A spring seat assembly having a frame, a zigzag spring connected at its opposite ends to the frame, a helper spring support disposed below the zigzag spring, a helper spring bridging between the support and the zigzag spring and together with the latter having coextensive portions in tangential rubbing engagement with one another for a substantial length, and an applied surface of sound deadening material carried by one of the springs upon at least a portion of their interface of engagement.

10. A spring seat assembly having a seating portion formed with zigzag wires and cantilever spring means for exerting pressure on the zigzag wires, support means for the cantilever spring means comprising a torque tube connected to one end thereof, and means for rotating the torque tube comprising a crank affixed thereto and a handle controlled actuator, said actuator having an actuator rod connected to the crank and having plate means reciprocated by the control handle to drive the rod and crank for adjusting the position of the torque tube and the cantilever springs.

11. A spring seat assembly having a seating portion formed with zigzag wires and cantilever spring means for exerting pressure on the zigzag wires, support means for the cantilever spring means comprising a torque tube connected to one end thereof, and an actuator having a control rod connected to rock the torque tube into adjusted positions, said actuator having apertured gripper plates which together coaxially receive the rod with one plate effective to hold it in locked adjusted positions and the other plate reciprocable to drive the rod and adjust the position of the torque tube, and means including a crank to reciprocate said other gripper plate.

12. A spring seat assembly having a seating portion formed with zigzag wires and cantilever spring means for exerting pressure on the zigzag wires, support means for the cantilever spring means comprising a torque tube connected to one end thereof, and means for rotating the torque tube comprising a crank affixed thereto, a reciprocably operated control device having a control rod connected to the crank for adjustably positioning the rotatable member, a rock shaft swingably supporting the control device and independently rockable to reciprocably operate the control device and drive the control rod in one direction, and a handle for rocking the rock shaft.

13. A seat assembly comprising a base frame, a row of zigzag wires forming a reticulated seating surface and each having bent leg portions depending at the opposite ends of its seating portion and connected to the base frame for elastically supporting the seating surface thereabove, edge wire means along an edge of the seating surface and connecting together the zigzag wires at points adjacent the juncture of the seating portion of each wire and its leg portion in one row, a torque tube journaled to the base frame for rocking movement on a fixed axis disposed adjacent and longitudinally of said row of leg portions, spaced apart flat springs forming individual connections between the torque tube and different ones of said zigzag wires, the spring for one wire having an anchored end affixed tangentially to the torque tube at a point in line with the anchoring points of the other springs and curving upwardly therefrom and then bowed laterally and finally in a downwardly inclining direction to engage the seating portion of the corresponding zigzag wire in extended tangential contact adjacent the other one of the leg portions of the wire, a control device to adjust the rocked position of the torque tube for changing the stress and degree of bow in the flat springs in unison, and locking means for said control device to prevent release of the springs.

14. In a spring arrangement for cushioned structures, a spring strip having a load carrying supported portion and supporting portions offset from the ends thereof for attachment to a frame, said strip adapted to receive the bulk of said load at a point somewhat closer to one supporting portion than to the other, and a tandem spring supported at a point generally adjacent to said other supporting portion and curving into tangential relationship with said strip in the direction of said one portion so as to provide a sliding interface of contact therewith in cooperating with said supported portion to support said load.

15. In a spring arrangement for cushioned structures, a spring strip having a load carrying seating portion and front and rear supporting portions offset from the respective ends thereof for attachment to a frame, said strip adapted to receive the bulk of said load at a point somewhat closer to the rear supporting portion than to the front supporting portion, and a tandem spring supported at a point generally adjacent the front supporting portion and curving rearwardly into tangential relationship with said strip in the direction of said rear portion so as to provide a sliding interface of contact therewith in cooperating with said seating portion to support said load.

References Cited in the file of this patent

UNITED STATES PATENTS

| | | |
|---|---|---|
| 1,404,031 | Kelman | Jan. 17, 1922 |
| 2,049,550 | Van Dresser et al. | Aug. 4, 1936 |
| 2,049,551 | Van Dresser | Aug. 4, 1936 |
| 2,384,191 | Neely | Sept. 4, 1945 |
| 2,633,360 | Ory | Dec. 22, 1953 |
| 2,740,468 | Gonia et al. | Apr. 3, 1956 |

FOREIGN PATENTS

| | | |
|---|---|---|
| 683,188 | France | Feb. 24, 1930 |